July 12, 1966 P. J. ROSEN 3,260,107
GUN PRESSURE MEASURING DEVICE
Filed Oct. 31, 1963 2 Sheets-Sheet 1

INVENTOR.
PHILIP J. ROSEN

July 12, 1966 P. J. ROSEN 3,260,107
GUN PRESSURE MEASURING DEVICE
Filed Oct. 31, 1963 2 Sheets-Sheet 2
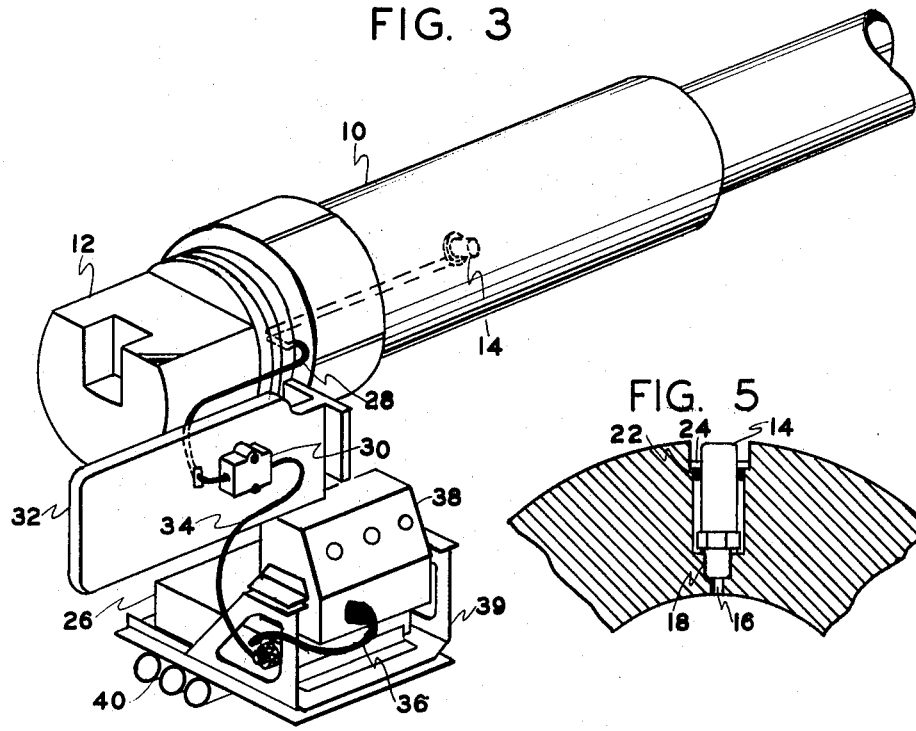
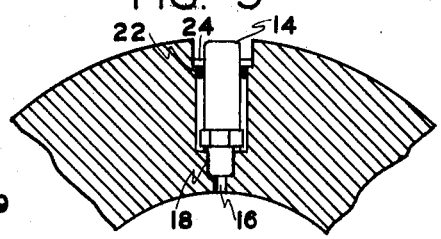
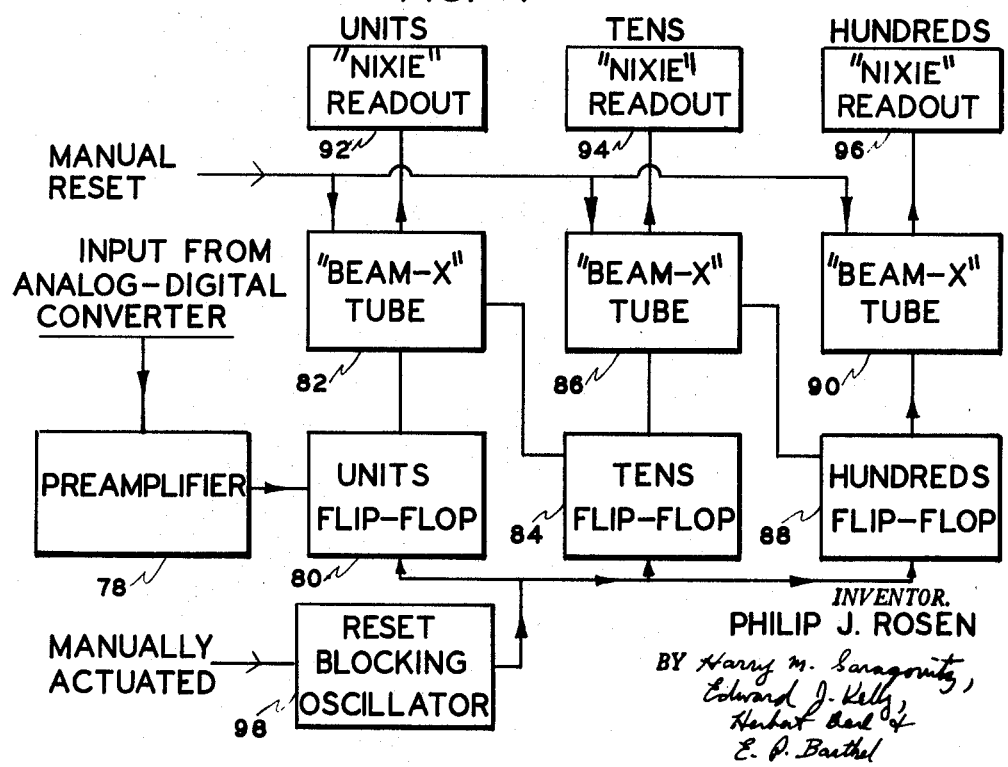
INVENTOR.
PHILIP J. ROSEN

United States Patent Office 3,260,107
Patented July 12, 1966

3,260,107
GUN PRESSURE MEASURING DEVICE
Philip J. Rosen, Oak Park, Mich., assignor, by mesne assignments, to the United States of America, as represented by the Secretary of the Army
Filed Oct. 31, 1963, Ser. No. 320,590
1 Claim. (Cl. 73—167)

The invention described herein may be manufactured and used by or for the Government for Governmental purposes, without payment to me of any royalty thereon.

This invention concerns a device for accurately measuring the peak pressure generated in a gun tube during the firing of a projectile. This pressure can be correlated with the output velocity to determine any changes in the projectile trajectory due to a change in the velocity. The pressure is sensed by a low level strain gage transducer mounted in the gun tube. The transducer has a maximum rating of 80,000 p.s.i. The instrument consists of a linear transistorized D.C. amplifier with a low-level transistor modulator input stage, driving an analog-to-digital converter employing sweep conversion techniques. The output of the converter drives a Nixie type three-digit decimal readout.

The total system accuracy is within one percent. The system will respond to pressure waves having rise times of two to five milliseconds with peaks of less than one millisecond duration. The required power forms are obtained from a pre-regulator and a D.C. to D.C. Converter.

The object of the present invention is to provide a gun pressure measuring device that will accurately measure the peak pressure in relatively heavy ordnance equipment, such as a 105 mm. gun used with a U.S. Army tank.

In the past decade considerable improvement has been made in the accuracy of tank fire control systems. However, there are still several unknown factors which influence the output velocity of the projectile and subsequently influence the accuracy of firing. These factors include gun tube wear, small differences in ammunition characteristics from different lots and temperature differential.

It would be desirable to measure the output velocity of the projectile, and on the succeeding round, change the superelevation angle of the gun to compensate for any deviation from the value used in the fire control system computation. However, it would be extremely difficult to measure this velocity, therefore, it is desirable to relate the velocity to another quantity. It has been found by experimentation that an approximately linear relationship exists between the output velocity of the projectile and the peak pressure generated in the gun tube over the pressure range under consideration.

During these tests, pressures were measured, with copper crusher gages. These are basically integrating devices, and, thus, do not give an indication better than approximately 85 percent of peak pressure, depending on the shape of the pressure trace.

The present invention was developed to accurately measure the peak pressure in the gun tube. Thus, any deviation in the peak pressure from a previously selected median value will necessitate a small change in the superelevation angle on the succeeding round.

The invention together with others of its objects and features will be more fully perceived by reference to the following detailed description of a representative embodiment thereof, taken in conjunction with the accompanying drawings, in which:

FIG. 3 is a perspective illustration of an ordnance piece assembled with attachments for installation in a tank to measure the peak pressure in the gun tube.

FIG. 4 is a block diagram of the digital readout portion of the invention.

FIG. 5 is a fragmentary view, partly in section, of the transducer in the wall of the gun barrel of FIG. 3.

Figure 1:
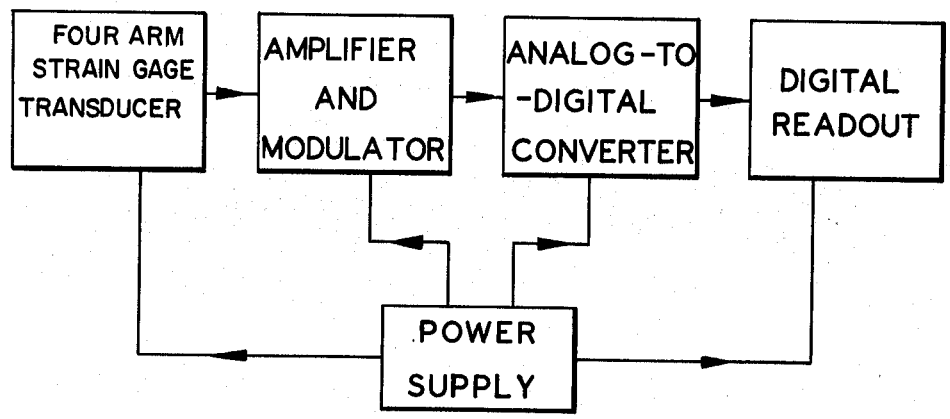
FIG. 1 is a block diagram of a gun pressure measuring device constructed in accordance with the present invention.

Referring to FIG. 3, a gun barrel 10 mounted in a gun mount 12 is provided with a straight tube type pressure transducer 14, arranged operatively to communicate with the bore of barrel 10. FIG. 5 shows a partial cross section of the gun barrel and coaxial orifice 16 of reduced diameter through which the pressure of the bore is transmitted to the transducer. The transducer is externally threaded at 18 so as to mate with corresponding threads tapped in the passage provided through the barrel wall which is concentric with a smaller orifice 16 which continues through the wall to the gun bore. The transducer 14 is of the bonded strain gage type which in the present embodiment was manufactured by Bytrex Corporation of Newton, Massachusetts. The maximum proofloaded pressure of this transducer is 84,000 p.s.i. Its overall accuracy is within approximately one-half percent exclusive of temperature effects. The pressure is sensed in the transducer cavity, measuring in this instance ⅛ inch in diameter by 1¾ inches in length, which communicates with orifice 16. The pressure connection is made by the threads at 18 maintaining an inverted 60° cone point (not shown) in sealed contact. A rubber seal is provided at 22 and a locking nut 24 for effectively securing the upper portion of the transducer.

The transducer can be operated for approximately one-half hour at 400° F. The sensitivity is approximately one millivolt output per volt of bridge voltage applied. The overall dimensions of the cell are ¾ inch diameter by 2⅛ inches in length. The electrical connection to the transducer is made via four feed-thru type, press-fit Teflon terminals located on the outside of the transducer (not shown). The connections between the transducer and the electronic equipment are made with a four conductor printed circuit type cable 28 between the transducer and the connector block 30 on the gunner's shield 32 and by a coaxial cable 34 between the connector block 30 and the unit 26. A second coaxial cable 36 connects the package unit 26 with the unit 38. It will be noted that enough slack is left in the cable 28 to allow for recoil of the gun.

All four arms of the strain gage (not shown) are contained in the transducer and are all active. Two arms act in tension while the remaining two arms act in compression. Temperature compensating resistors are built into the bridge circuit. The gages are bonded to the strain tube with a special high temperature epoxy cement.

With reference now to FIG. 1, a schematic representation of the apparatus used to carry out the principles of the present invention is illustrated. The output of the transducer 14 is fed to the modulator which in turn feeds the amplifier. The modulator is a transistorized circuit with low noise and low offset voltage. It is driven at a rate of 50 kilocycles per second by a simple magnetic square wave oscillator. The approximate noise level of the modulator is 100 microvolts. The input voltage to the modulator varies from 1.5 to 10 millivolts. The high chopping frequency of the modulator, whose application is the inversion of the slowly varying transducer signal into a rapidly varying one, was chosen to obtain sufficiently high resolution of the peak pressure signal. The circuit is a two-transistor common collector circuit whose signal is transformer coupled to the amplifier. A comprehensive discussion of chopper amplifiers and their relation to low level D.C. signal from transducers is set out on page 153 of Instrumentation for Engineering Measurements, 1962 edition, by Cerni and Foster, published by John Wiley & Son, Inc.

The amplifier is of the transistorized compound feedback type. It is highly linear and has low noise. The approximately closed loop gain is 60 decibels. Gain control is provided by a potentiometer on the amplified input which determines the level of the input to the amplifier. Demodulation is performed in the output by rectifying and filtering the 50 kilocycles from the transformer coupled output signal.

The transducer is balanced in a standard manner using a variable resistance network across two adjacent arms of the bridge. Calibration is accomplished by a substitution method in which the unbalanced bridge is substituted by a resistance with the same voltage across it. This voltage corresponds to the bridge output voltage with a known pressure applied. In this case the calibrating pressure is 50,000 p.s.i.

The analog-to-digital converter operates on the ramp-sweep conversion principle. With this method, a highly linear sweep voltage is generated and compared to the unknown input voltage. The time base oscillator is gated on and provides output pulses during the time interval between the start of the sweep and the point of equality between the known input and the sweep amplitude at which time a comparison pulse is generated.

Figure 2:
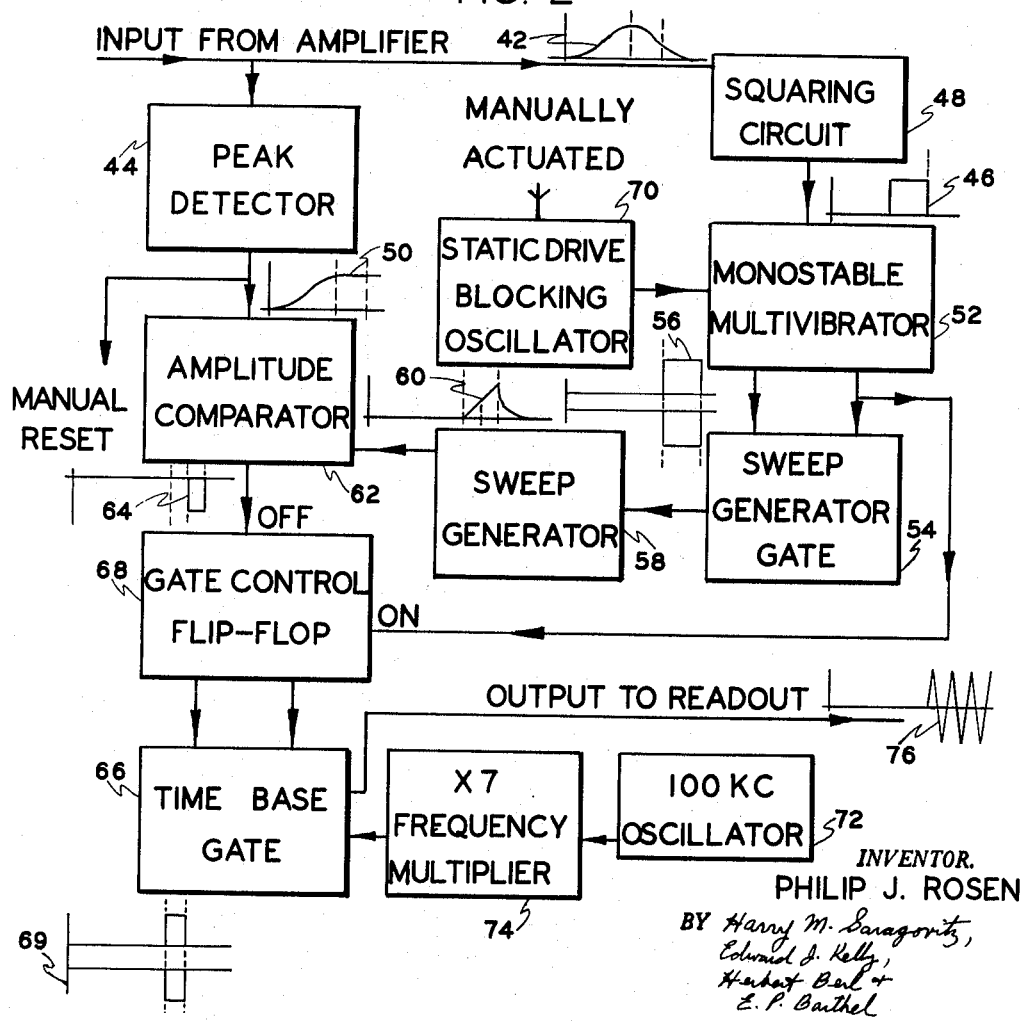
FIG. 2 is a functional block diagram of the analog-to-digital converter portion of the present invention together with wave forms.

A functional block diagram of the analog-to-digital converter is shown in FIG. 2. The demodulated output signal of the amplifier is the unknown input signal 42 to the analog-to-digital converter. This signal serves two functions as follows: (1) to charge the peak detector circuit 44 whose output is the actual unknown to be measured, and (2) to provide a signal which can be shaped to provide a trigger for the converter circuitry. The trigger signal 46 is provided by a squaring circuit 48 employing an amplifier and Schmitt trigger circuit. The logic switching circuit has been designed such that the squared falling portion of the pressure wave 42 form is used to trigger the converter. This will insure that, prior to any comparison, the desired peak signal 50 is stored in the peak detector 44. The trigger signal 46, derived by shaping the input signal in the squaring circuit 48, is used to trigger a "one shot," which is a collector coupled monostable multivibrator 52. This circuit provides a 1.5 millisecond gating signal to open the sweep generator clamping gate circuit 54, and thus, provide a linear sweep output from the sweep generator 58. The sweep generator clamping circuit 54 is a four diode gate which is triggered by complementary signals 56. This arrangement allows a minimum of pedestal to be present in the final linear sweep output. The sweep generator 58 is of the bootstrap type. A linearity adjustment has been included to provide a slightly convex sweep which can compensate for some non-linearities present in the amplifier and transducer. The linearity control is obtained by positive feedback of the second order term through a split timing capacitor. With the proper choice of boot-strapping capacitor, a linearity of ±5 percent can be easily obtained.

The sweep 60 is now compared with the information stored in the peak detector 44. The comparator 62 is a regenerative circuit employing diode conduction as the means of comparison. In vacuum tube work similar circuits are referred to as the "Multiar." When equality of the two signals has been reached, a pulse 64 is generated by the comparator 62. The time base gate 66 is gated open by the leading edge of the one shot pulse 56 which also triggers the sweep generator 58. This is accomplished by triggering one side of the gate control flip-flop 68 whose output is shown at 69. The time base gate 66 is turned off by the comparator pulse 64 on the other side of gate control flip-flop 68.

If, instead of a pressure signal input, there is a static pressure input, the demodulated output signal from the amplifier is D.C., therefore no trigger signal 46 can be derived by the squaring circuit 48. For this situation, a manually actuated static drive blocking oscillator 70 is included. This circuit is capable of driving the one shot 56 which will start the conversion process.

The time base circuitry consists of a crystal oscillator 72 cascaded to a 7:1 frequency multiplier 74. The output of the frequency multiplier 74 is connected to the input of the time base gate 66. The time base oscillator is a James Knight packaged, 100 kilocycle temperature stabilized crystal oscillator. The output amplitude is one volt R.M.S.

The frequency multiplication to the required time base of 700 kilocycles is performed by feeding the 100 kilocycles into a Schmitt trigger circuit whose output is tuned to 700 kilocycles. A second tuned amplifier stage is used to eliminate some distortion in the Schmitt trigger waveform. The frequency stability of the multiplier and oscillator is the same as that of the oscillator alone.

The digital readout, shown in FIG. 1, is driven by the output signal 76 of the time base gate 66. A functional block diagram of the readout is shown in FIG. 4. The readout consists of neon glow in-line digital display tubes in which the numerals 0 to 9 are formed as electrodes. One such circuit, used in the instant invention, is a three-place Nixie tube numerical readout driven by miniature magnetic beam switching tubes which is sold in commercial form by the Burroughs Corporation. A pre-amplifier input stage is used to provide an adequate driving signal.

As can be seen in FIG. 4, the unit is basically a serial type digital adder with parallel type readout devices. The pre-amplifier 78, which is a simple pentode amplifier stage, drives the "units" flip-flop 80. This is a critically designed high frequency circuit which will operate up to 1.1 megacycles with 100 volts output. It is only necessary, however, that the stage provides approximately 90 volts at 700 kilocycles. This in turn drives the beam switching tube 82 (Burroughs Beam-X Series). The 10:1 divided output of the Beam-X drives the "tens" flip-flop 84 which in turn drives the tens beam switching tube 86. This is repeated through the hundreds stage flip-flop 88 and beam switching tube 90. The individual cathodes of the Nixie readout tubes 92, 94, and 96 and connected to the appropriate Beam-X tube target terminal. The Beam-X tubes are reset to zero manually; the flip-flops are reset with a pulse from manually actuated blocking oscillator 98. The peak pressure is read out as the first three significant digits.

The power supply is basically a magnetically regulated D.C. to D.C. converter. Regulation is required over the range of input voltages from 18 volts to 30 volts D.C. from the vehicle tank battery supply. In general, there are only minor variations in load.

As can be seen in FIG. 3, the electronic components of the gun pressure measuring device is built into two individual packages 26 and 38. Package unit 38 contains the digital readout, main power supply transformer, reset relay, and all manually actuated switches. The package unit 26 contains the amplifier, modulator, converter and power supply regulator and drivers. The unit housings are fabricated from sheet aluminum and both packages are waterproofed. From FIG. 3, it can be seen that the units 26 and 38 are shock mounted to the ammunition storage rack 40 located under the gun.

It will be apparent that the illustrative embodiment of the invention described above is susceptible to various modifications within the purview of the invention. Accordingly, the invention is not limited to the embodiment shown and described but is to the scope defined in the appended claim.

I claim:

A system for measuring the peak pressure generated in a gun barrel by the firing of a projectile therethrough comprising a bonded strain gage transducer employing a four arm bridge circuit mounted on said gun barrel, said transducer secured in an opening in the wall of said gun barrel which opening extends entirely through said wall, said transducer positioned so as to be stressed by pressure in said barrel, said transducer supplying a signal to a modulator, said modulator being driven at a rate in the order of 50 kilocycles per second by a magnetic square wave oscillator so as to obtain a high resolution of the peak pressure signal, said pressure signal thereafter fed to an amplifier which produces a demodulated output signal, an analog-to-digital converter circuit operating on a ramp-sweep conversion principle whereby a highly linear sweep voltage is generated, a peak detector circuit combined with said converter circuit, said demodulated signal output of said amplifier performing the dual functions of charging said peak detector circuit and providing a signal which triggers said converter, whereby said sweep voltage is compared to said demodulated signal, the output signal of said converter providing a pattern of signals for use in a digital readout system whereby the said peak pressure is read out as the first three significant digits.

References Cited by the Examiner

UNITED STATES PATENTS

| | | | |
|---|---|---|---|
| 2,858,438 | 10/1958 | Merrill | 340—206 X |
| 2,924,964 | 2/1960 | Minke | 73—35 |
| 3,127,768 | 4/1964 | Mason | 73—167 |

OTHER REFERENCES

Bollinger: "Design and Performance of a Thrust Transducer," ISA Journal, August 1956, pages 260–264.

DAVID SCHONBERG, *Primary Examiner.*